United States Patent

Huegel

[11] Patent Number: 5,239,480
[45] Date of Patent: Aug. 24, 1993

[54] AUTOMATIC TICKET DISPENSING SYSTEM

[75] Inventor: Douglas Huegel, Mount Royal, Canada

[73] Assignee: AIS Infonetics Inc., Montreal, Canada

[21] Appl. No.: 654,730

[22] Filed: Feb. 12, 1991

[51] Int. Cl.⁵ .............................................. G06F 15/26
[52] U.S. Cl. ..................................... 364/479; 364/401; 364/407; 235/381
[58] Field of Search ............... 364/479, 478, 407, 401, 364/DIG. 1, DIG. 2; 235/381, 384

[56] References Cited

U.S. PATENT DOCUMENTS

| | | | |
|---|---|---|---|
| 3,622,995 | 11/1971 | Dilks et al. | 364/407 X |
| 4,186,438 | 1/1980 | Benson et al. | 364/200 |
| 4,247,759 | 1/1981 | Nora et al. | 235/381 |
| 4,359,631 | 11/1982 | Lockwood et al. | 235/381 |
| 4,449,186 | 5/1984 | Kelly et al. | 364/407 X |
| 4,788,643 | 11/1988 | Trippe et al. | 364/900 X |

*Primary Examiner*—Joseph Ruggiero
*Attorney, Agent, or Firm*—Fishman, Dionne & Cantor

[57] ABSTRACT

The system includes a plurality of self-service terminals each of which includes a central processor and which services a plurality of locations at which sporting, dramatic, musical, etc. events are to be held. The central processor of each terminal is in communication with a central processor in each location, and the central processor of each location includes information concerning all available seats for all events at that location at all times. Accordingly, each terminal has access to the best available seats at any time that the terminal is being used.

21 Claims, 7 Drawing Sheets

AUTOMATIC TICKET DISPENSING SYSTEM

BACKGROUND OF INVENTION

1. Field of the Invention

The invention relates to a self-service terminal for selecting and dispensing tickets and a ticketing system including a plurality of such self-service terminals. The invention also relates to a method for selecting and dispensing tickets using the self-service terminal.

2. Description of Prior Art

At one time, tickets for an event, such as a sports event, a concert, a play, showings at a museum, showings at a planetarium,, showings at an aquarium, etc., were sold at the location at which the event was held, for example, a sports arena, theaters, planetariums and aquariums, etc. However, as it became inconvenient, especially in larger cities, to go to the location before the event to pick up tickets, ticket dispensing stations were opened up at places other than the location at which the event is being held.

One of the problems with such ticket dispensing stations is that each location receives an allotment of seats, and the tickets for the seats can be sold only at the station to which it was allotted. Thus, it is possible that one ticket dispensing station will be completely sold out for an event while another station has very good seats. It can therefore be seen that it would be desirable for all stations to have access to all available seats any time a customer wishes to buy tickets.

Again, such ticket dispensing stations are typically manned stations so that their hours of operation are limited and the cost of running them is relatively high. Further, although some stations will include floor plans of the locations, so that it is possible to give the ticket purchaser an indication of where his seats will be located, such floor plans are not always available at all stations.

What might be considered to overcome the above disadvantages are automatic vending machines connected in a network by telephone links and having printing facilities for printing tickets. An automatic vending machine is illustrated in U.S. Pat. No. 4,636,963, Nakajima et al, Jan. 13, 1987. In fact, the Nakajima et al patent is more directed at a control system for such an automatic vending machine. U.S. Pat. No. 4,766,548, Cedrone et al, Aug. 23, 1988, teaches a telephone link monitoring and reporting system.

U.S. Pat. No. 4,784,289, Ogawa et al, Nov. 15, 1988, teaches a mechanical arrangement for printing and issuing tickets. U.S. Pat. No. 4,896,791, Smith, Jan. 30, 1990, teaches an apparatus for dispensing coupons wherein images are displayed on different parts of the screen as shown in FIG. 1 of the patent. To select a coupon for the image displayed in any one of the squares, a pressure sensitive area of that square (e.g. 26 or 28) is pressed. The system then prints and dispenses a coupon for the product illustrated by the image in the square. Thus, although some of the parts for a desirable system are a part of the prior art, the general principles of such a desired system, either in terms of desired results or parameters of operation, are not known in the art.

SUMMARY OF INVENTION

It is therefore an object of the invention to provide a ticketing system which overcomes the disadvantages of the prior art.

It is also an object of the invention to provide a ticketing system using self-service terminals which are fully automatic in operation.

It is a further object of the invention to provide a method for using the self-service terminals.

It is a still further object of the invention to provide such an improved self-service terminal which increases consumer participation and control in the selection and purchasing of tickets for seats for preselected events.

It is a still further object of the invention to enable ticket purchasers to purchase tickets for events in locations far removed from the locations of the events, and to have access to purchasing the "best seats" available at the time of a purchase.

In accordance with a feature of the invention, an encrypted bar code number is printed on the ticket in order to prevent fraud.

It is a still further object of the invention to provide such a system which interfaces the self-service terminals with processors at the locations of the events in order to access seat inventory data bases at the location processors.

It is a still further object of the invention to enable a consumer to make a ticket purchase by easily proceeding through a series of touch menus on a display screen.

In accordance with a feature of the invention, the screen is a touch screen whereby the consumer can simply touch different areas of the screen to make appropriate choices.

It is a still further object of the invention to provide a self-service terminal which permits a purchaser to pay for his tickets with either a credit card or with exact cash in paper currency.

It is a still further object of the invention to provide a self-service terminal having a processor programmed so that the purchaser can select his area of choice in the event location and to request best seats available in that area.

It is also an object of the invention to enable a purchaser to reject a seat assignment and to request best seats available in a different area.

In accordance with the invention there is provided a self-service terminal for selecting and dispensing tickets, to a user, for any one of a plurality of events on the basis of a plurality of parameters, each parameter having a plurality of elements, each event being held in any one of a plurality of locations, a plurality of location processors equal to the plurality of locations, each location processor being associated with a respective one of said locations;

said self-service terminal comprising:

a central processor and an associated video display device having a display screen;

said central processor including memory means for storing data concerning said plurality of events and said plurality of locations;

said central processor being programmed to permit a user to select one or more tickets for any one of said events, to be held at a predetermined time, at any one of said locations;

said self-service terminal further including;

means for receiving payment for said selected tickets;

means for dispensing said selected tickets; and means for effecting communication between said central processor and said means for receiving and said means for dispensing;

whereby, said means for receiving and said means for dispensing are under the control of said central processor.

Also in accordance with the invention there is provided a system for selecting and dispensing tickets to a user, at any of a plurality of stations, for any one of a plurality of events on the basis of a plurality of parameters, each parameter having a plurality of elements, each event being held in any one of a plurality of locations, a plurality of location processors equal to the plurality of locations, each location processor being associated with a respective one of said locations, each location processor having memory means for storing an inventory of seat dispositions including available seats and booked seats for events to be held at its respective location;

wherein each self-service terminal comprises:

a central processor and an associated video display device having a display screen;

said central processor including memory means for storing data concerning said plurality of events and said plurality of locations;

said central processor being programmed to permit a user to select one or more tickets for any one of said events, to be held at a predetermined time, at any one of said locations;

said self-service terminal further including;

means for receiving payment for said selected tickets;

means for dispensing said selected tickets; and means for effecting communication between said central processor and said means for receiving and said means for dispensing;

whereby, said means for receiving and said means for dispensing are under the control of said central processor.

Still further in accordance with the invention there is provided a method of selecting and dispensing tickets to a user, at any one of a plurality of stations, for any one of a plurality of events on the basis of a plurality of parameters, each parameter having a plurality of elements, each event being held in any one of a plurality of locations, each station including a self-service terminal having a central processor and an associated video display device having a display screen, each central processor including memory means for storing data concerning said plurality of events and said plurality of locations, a plurality of location processors equal to the plurality of locations, each location processor being associated with a respective one of said locations, each location processor having memory means for storing an inventory of seat dispositions including available seats and booked seats for events to be held at its respective location, each of said central processors being in communication with all of said location processors;

said method comprising:

A) said user activating said central processor at one of said stations, whereby said central processor provides data to said associated video display device so that said display screen presents an initial screen listing said parameters, whereby said user can select one of said parameters;

B) said central processor providing parameter element data to said associated video display device whereby said display screen presents a parameter screen listing said elements of said one selected parameter, whereby said user can select one of said elements of said selected parameter;

C) said central processor providing further parameter element data to said associated video display device whereby said display screen presents a further parameter screen listing said elements of said further parameter, whereby said user can select one of said elements of said further parameter;

D) repeating step C) until each element of each one of the plurality of parameters has been separately listed, and one element of each parameter has been selected;

whereby, all parameters for the ticket selection have been selected, one of said selected parameters comprising a selected one of said plurality of locations and another one of said selected parameters comprising a selected event at said selected location a third one of said parameters being a selected date for said selected event;

E) said central processor providing data to said associated video display device concerning the seating areas at said location whereby said display screen presents a listing of said seating areas of said selected location, whereby said user can select one of said seating areas;

F) said central processor communicating with said location processor at said selected location to obtain data concerning seat disposition for said selected event at said selected time in said selected area at said selected location;

G) said central processor selecting available seats in said selected area and providing data to said associated video display device whereby said display screen presents a seating lay-out of said seating area, and including means for separately indicating said available seats;

H) said user indicating acceptance or rejection of said available seats;

I) said central processor dispensing tickets for said available seats if said user indicates acceptance of said available seats; or J) if said user refuses said available seats, repeating steps A) to I) until said user accepts available seats or terminates the procedure.

BRIEF DESCRIPTION OF DRAWINGS

The invention will be better understood by an examination of the following description, together with the accompanying drawings, in which.

DESCRIPTION OF PREFERRED EMBODIMENTS

In accordance with the invention, there are provided a plurality of stations, for dispensing tickets for events, such as sporting events, concerts, plays, museum showings, planetarium showings, aquarium showings etc. held at any one of a plurality of locations, such as sports arenas, theaters, museums, planetariums, aquariums, etc. The stations are disposed at geographical places different from the locations at which the events are to be held although there could be one or two stations at the event locations as well. These stations are similar in appearance to automatic tellers and automatic cash dispensing machines and therefore require no further description here.

Figure 1:
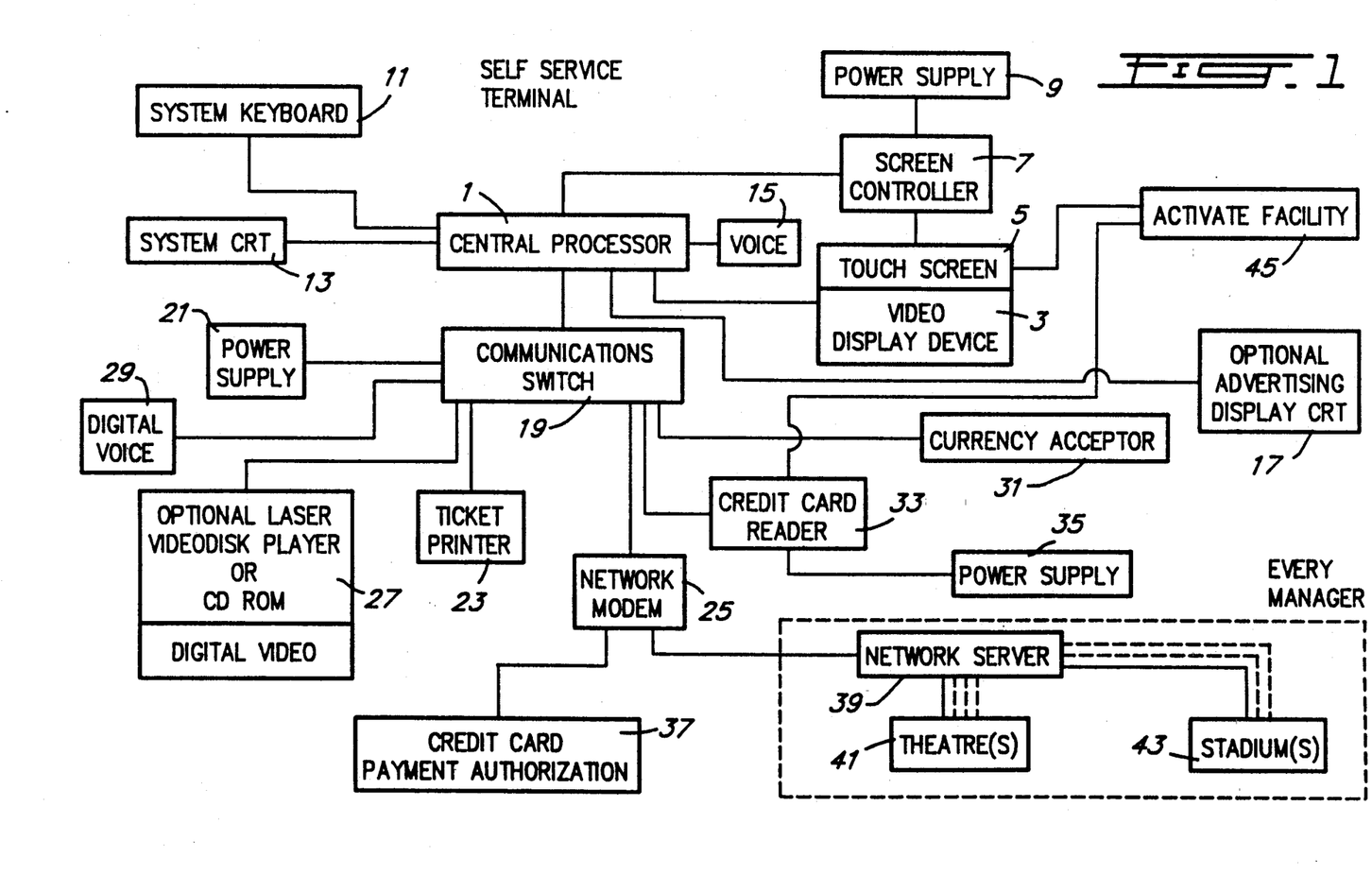
FIG. 1 is a block diagram of a self-service terminal which also illustrates connections to external facilities.

Each station includes a self-service terminal, and a block diagram of the electronics of one embodiment of such a self-service terminal is illustrated in FIG. 1.

Turning to FIG. 1, each self-service terminal includes a central processor 1. The central processor may be, for example, of the type designated INTEL 8286.

Each central processor has a memory in which is stored a complete listing of all of the events at all of the locations services by that self-service terminal. The list is accessible either by the names of the events, by the locations at which the events are held, or by the dates on which the events are held, Associated with the central processor is a video display device 3 having a display screen 5, preferably, a touch screen so that choices can be made by touching appropriate areas of the screen. The touch screen is preferably of the type described in U.S. Pat. No. 4,896,791, above referred to, and includes touch selection areas, each such area comprising a touch-sensitive switch. To make a choice, the user touches the appropriate area and this activates the switch under the touched area. The touch screen is under the control of screen controller 7 which is also in communication with the central processor 1. Power for the screen controller and the display device is provided by power supply 9.

A system keyboard 11 and system CRT 13 are also provided for the purpose of testing and monitoring the self-service terminal, as is well known in the art. Of course, the keyboard 11 and CRT 13 are not normally connected to the central processor 1 but would be connected only when the self-service terminal has to be tested or monitored.

As an optional feature, an audio device 15 could be connected to the central processor for running advertisements on a continuous basis. The advertisements would relate to the events presently available at the self-service terminal. Another optional feature is a display CRT 17 which would provide visual advertising, also on a continuous basis, of events available at the self-service terminal.

The central processor 1 is connected to a communication switch 19 which is powered by power supply 21. The communication switch will, selectively, connect central processor 1 to a ticket printer 23 or to a network modem 25. Again, as an optional feature, the communication switch could be connected to a video disc or a CD ROM which could provide visual displays of a selected event on a digital video. As a further optional feature, the communication switch could connect the provide audio information concerning a selected event.

The communication switch 19 also connects the central processor, selectively, to a currency acceptor 31 or to a credit card reader 33. The currency acceptor would accept currency, in bills, in payment for tickets and would have facilities for counting the currency accepted. A credit card reader would read a credit card provided by a purchaser for further processing by the central processor 1. The credit card reader is powered by a power supply 35.

The network modem 25 will connect the self-service terminal to either a credit card payment authority 37 or to a network server 39. When the self-service terminal is connected to a credit card payment authority, the information provided to the central processor 1 by the credit card reader 33 about a purchaser's credit card is transmitted to the credit card credit granting authority. The credit card credit granting authority will check the credit card and advise the central processor as to whether this credit card could be accepted. Credit card credit granting authorities could include, for example, the American Express Company, Visa Card Credit Authorities, Mastercard Credit Authorities, etc.

The network server 39 will connect the self-service terminal to any one of the selected locations, for example, theaters 41 or stadiums 43. In accordance with the invention, each location will include a location processor having, in its memory, information concerning available seats at that location in the area selected by a purchaser. This information will be provided, through the network server 39, through the network modem 25 and through the communication switch 19 to the central processor 1. The central processor will then, as will be described below, provide this data to the video display device 3 for display on the video screen 5. Preferably, each central processor or location processor will be programmed with a "best seat selection" program. The best available seats will be selected on the basis and under the guidance of this program. Each self-service terminal will also include an activate facility 45. As will be described below, it is contemplated, in accordance with the invention, that the self-service terminal could be activated either by touching the screen, if the screen is a touch screen, or by insertion of a credit card of a purchaser, or both. Obviously, if the screen is not a touch screen, then a START button could be provided for activating the self-service terminal.

In order to understand the software which drives the central processor 1, attention is directed to FIGS. 2A, 2B, 3A and 3B of the drawings. The flow chart illustrated in FIGS. 2A and 2B uses symbols which are not standard flow chart symbols. Nevertheless, FIGS. 2A and 2B do quite clearly and unambiguously describe the software which drives the central processor 1.

Figure 2A:
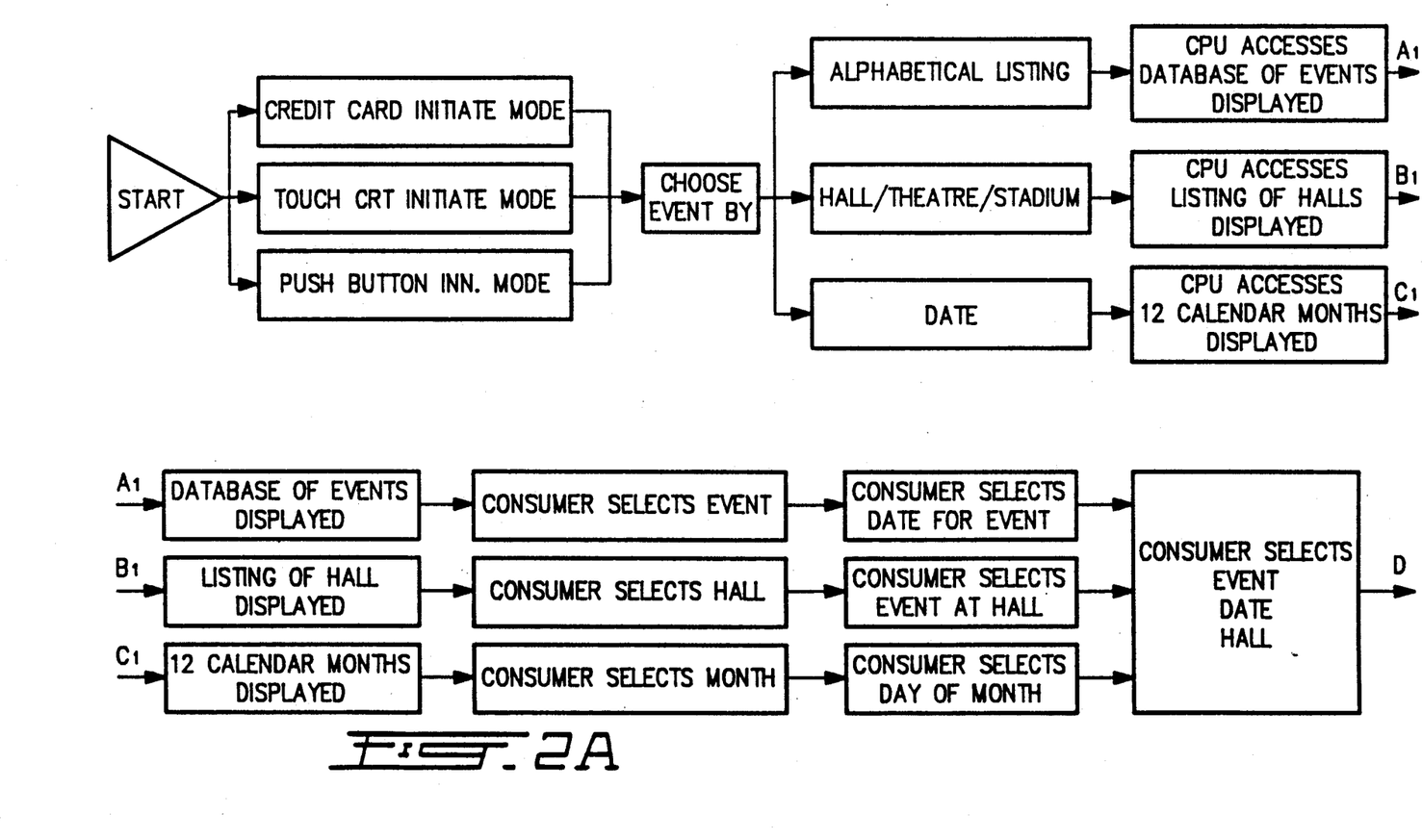
FIGS. 2A and 2B illustrate a flow chart of the operation of the central processor shown in FIG. 1.
Figure 3A:
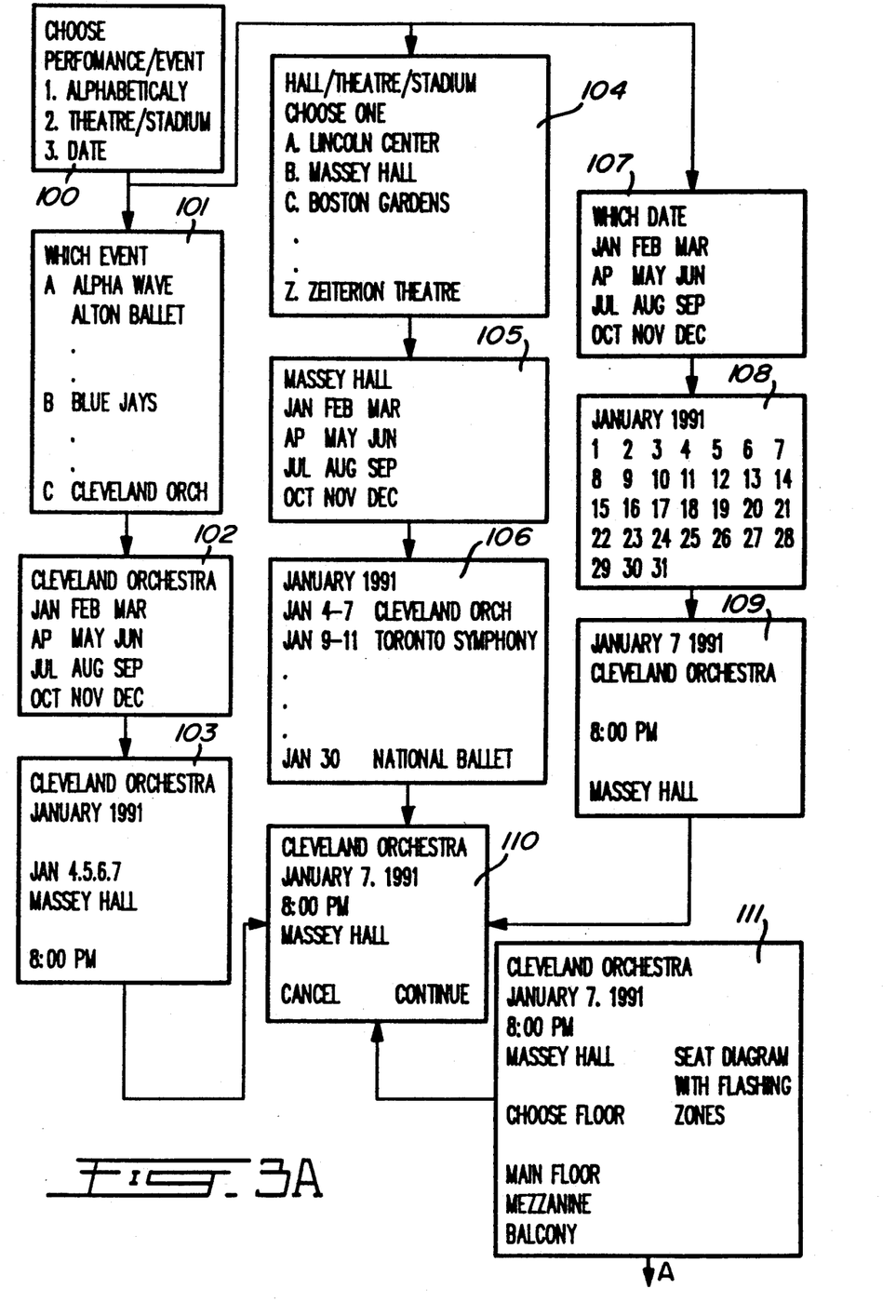
FIGS. 3A and 3B illustrate screens in sequential arrangement of the operation of the self-service terminal.

A cycle is first started either, as shown in FIG. 2A, by the credit card initiate mode, the touch screen initiate mode or the START button initiate mode. When the cycle is initiated, the central processor 1 provides data to the video display device 3 so that the video display device displays, on its screen 5, a list of choices one of which is to be selected by the user. The screen is illustrated at 100 in FIG. 3A. As can be seen, the choices are:

1. an alphabetical listing of all of the events serviced by the self-service terminal;

2. a list of all of the locations serviced by the self-service terminal; and 3. a list of months of the year of which the user will select one.

We will now follow each choice to its ultimate conclusion before starting on the next choice. If the user selects the alphabetical listing, then the central processor 1 provides data to the video display device 3 so that it displays on its screen a list of all of the events, in alphabetical order, serviced by the self-service terminal. This is illustrated at screen 101 in FIG. 3A.

The list of events will almost inevitably occupy more than one full screen. In order to handle the complete list, the list can either be slowly scrolled, so that the user can make a choice even as the list is scrolled. Alternatively, the list can be presented one screen at a time. The user would then be provided with a facility for changing the screen if he does not wish to make a selection on the screen presently in view.

The user then makes a selection of one of the events and the central processor 1 then provides data to the video display device 3 so that it displays on its screen 5 the event name along with a listing of all the L twelve months of the year, or, in the case where an event is held in only a few months, those months in which the event is held. The user then selects one of the months, and the central processor 1 then provides data to the video display device 3 so that the video display device 3 displays on its screen 5 complete details of that event in that month including the dates and the location at which the event will be held as well as the time at which the event starts. The name of the event and the listing of the months is seen in screen 102 of FIG. 3A and the name of the event with complete details including location and time of start is illustrated at screen 103 in FIG. 3A.

If the user selects instead a listing of locations serviced by the self-service terminal instead of the alphabetical listing of events, then the central processor provides the video display device with data concerning the list of locations and the list of locations would then be displayed on the screen 5. Such a screen is illustrated a 104 in FIG. 3A. Once again, as the list of locations will inevitably occupy more than one complete screen, the complete list can be presented either by scrolling the screen or by presenting the list L one screen at a time as per the alphabetical list of L events. In any case, the user selects a particular location whereupon the central processor 1 provides data to the video display device 3 so that the video display device presents on its screen 5 the name of the selected location along with a list of all twelve months of the year or the months in which the event is held. This is illustrated in screen 105 of FIG. 3A.

After a month is selected, the central processor 1 will provide data to the video display device 3 so that it presents on its screen a list of all events in the selected location during the selected month as illustrated in screen 106 of FIG. 3A. This list may also occupy more than a complete screen so that, once again, the complete list will be presented either by scrolling the screen or by presenting the list one screen at a time. As seen at screen 106, the list includes not only the name of the event, but the dates on which the event will be held. The user will then select an event and a date on which the event will be held.

If, on the initial screen, the user selects the third choice, then the central processor 1 provides the video display device 3 with a list of the twelve months of the year which it then displays on its screen as illustrated at 107 in FIG. 3A. The user then selects one of the months whereupon the central processor 1 provides the video display device 3 with data concerning all of the dates of that month and this would be displayed on the screen 5 as illustrated at 108 in FIG. 3A. The user then selects a particular date in the selected month, and the central processor 1 then provides the video display device 3 with data concerning events which will be held on the selected date of the selected month. This is then displayed by the video display device on its screen 5 as shown at 109 in FIG. 3A. As can be seen, the screen will display the names of the events along with the locations at which the events are L to be held along with the time at which the events will start. Once again, a complete list may occupy more than a full screen so that the complete list will be presented either by scrolling the screen or by presenting the list one screen at a time. In any case, the user will select a particular event.

It will be obvious that, after the user makes a selection on either one of screens 103, 106 or 109, the same situation will prevail, namely, the user will have selected a particular event for a particular date at a particular location as illustrated at screen 110 in FIG. 3A.

Figure 2B:
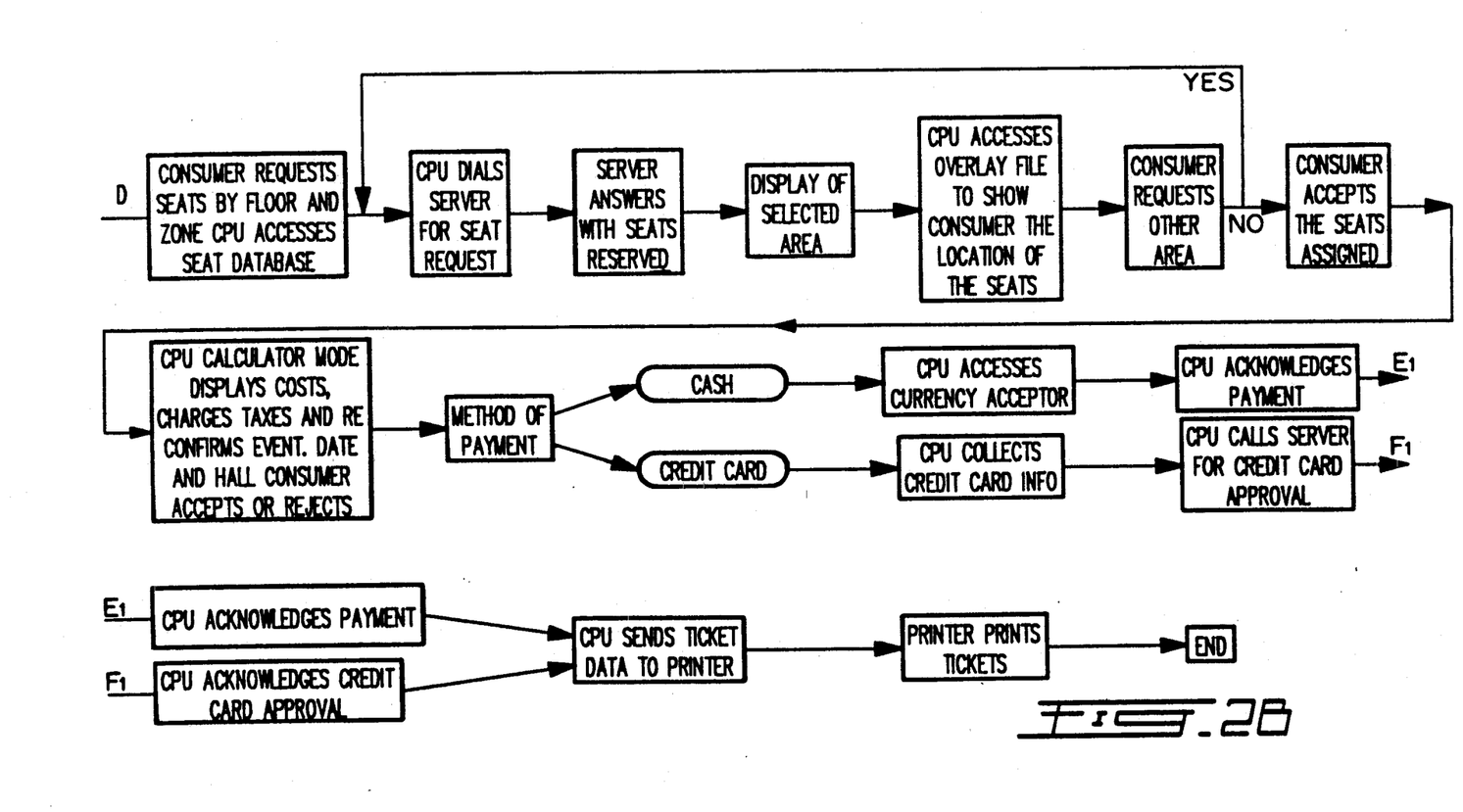

The user then makes the decision to either continue the process or to cancel the process. Should the user decide to continue the process, he will in effect be requesting information concerning different seating areas at the selected location, as seen in FIG. 2B. Data concerning these areas is provided by the central processor 1 to the video display device 3 whereupon such seating areas are displayed on the screen 5 as shown at 111 in FIG. 3A. In screen 111, the different areas are different floors, for example, the main floor, the mezzanine or the balcony. Different locations may have different types of area breakdowns. For example, in an ice-hockey arena, the areas may define the distance between the seats and the ice-hockey surface. Thus, area 1 could be a ring of seats close to the ice, area 2 could be a second ring of seats further removed from the ice than area 1, etc.

In any case, the user selects one of the areas and the central processor 1 then provides data to the video display device 3 which includes the price of seats in the selected area as well as a request for the number of seats that the user wishes to purchase. This is as illustrated in screen 112 of FIG. 3B.

The central processor 1 now has complete information about the location, the name of the event, the area in the location, the time and date, and the number of tickets requested for the above. The central processor 1 now accesses the location processor of the selected location so that it can obtain information concerning the availability of seats for the selected event on the selected date in the selected area. To accomplish this, the central processor 1 dials the network server 39 requesting the information. The network server contacts the location processor which then selects appropriate seats with a best seat available selection algorithm which does not form a part of the present invention. A temporary reserve is put on the selected seats. The network server 39 receives data concerning the best seats available from the location processor, and it forwards this data to the central processor 1. During this process, the central processor 1 provides the video display device 3 with data for forming a message on its screen 5 as illustrated at 113 in FIG. 3B. When the information has been received, the central processor 1 provides the video display device 3 with data for forming a floor plan of the selected area of the selected location so that the video display device 3 is in a position to display this floor plan on its screen 5. The central processor 1, at the same time, provides the video display device 3 with data for forming an overlay of the temporarily reserved seats on the seat plan so that this can also be displayed on the display screen 5. The video display device then has all of the data for presenting a screen as shown at 114 in FIG. 3B. The selected seats are separately indicated as, for example, by causing the selected seats to blink, by making the selected seats darker, or by pointing arrows at the selected seats. Although the manner of separately indicating is a matter of design choice, it is a special feature of the invention that the selected seats be separately indicated, and it is preferred that the selected seats be caused to blink in order to separately indicate them.

Figure 4:
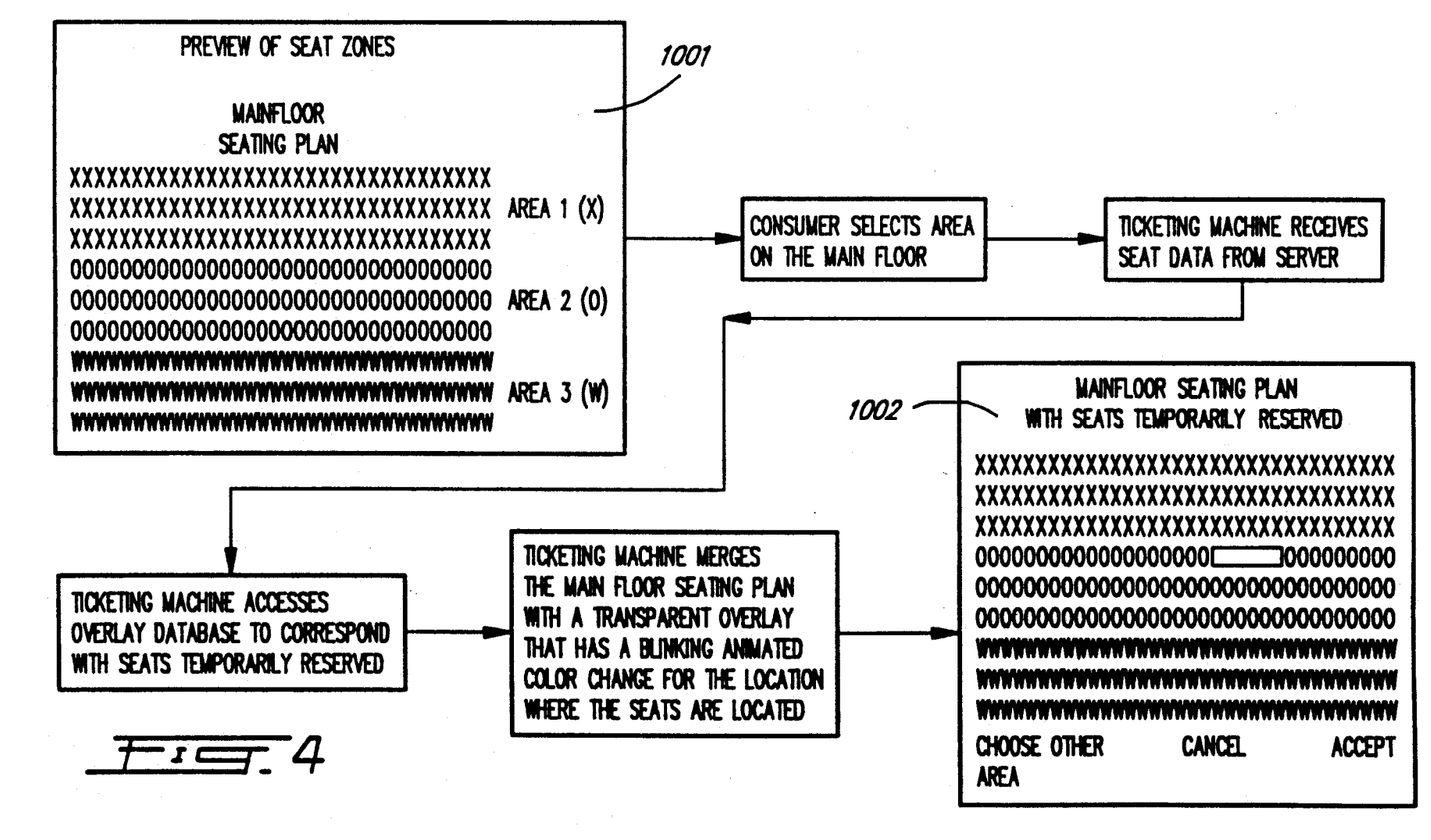
FIG. 4 is a combination sample screen and flow chart illustrating best seats available are illustrated in restrictive areas of the location.

An alternate approach to seat selection is illustrated in FIG. 4. Turning to FIG. 4, the video display device displays a screen as shown at 1001 in FIG. 4, namely, it shows a complete floor plan of the selected location. The user then selects a preferred area, and the central processor 1 queries the location processor concerning the best seats available in that area for the selected event on the selected date. Data concerning the best seats available is forwarded to the central processor 1, and the best seats available are put on temporary reserve by the location processor. With the information provided by the location processor, the central processor 1 provides the video display device 3 with data for forming an overlay of the best available seats. This data is merged with the floor plan data to present a screen as shown at 1002 in FIG. 4. In FIG. 4, the temporarily reserved seats are separately indicated by superimposing a black box on them. As above-mentioned, other methods can be used for separately indicating the temporarily reserved seats.

Figure 3B:
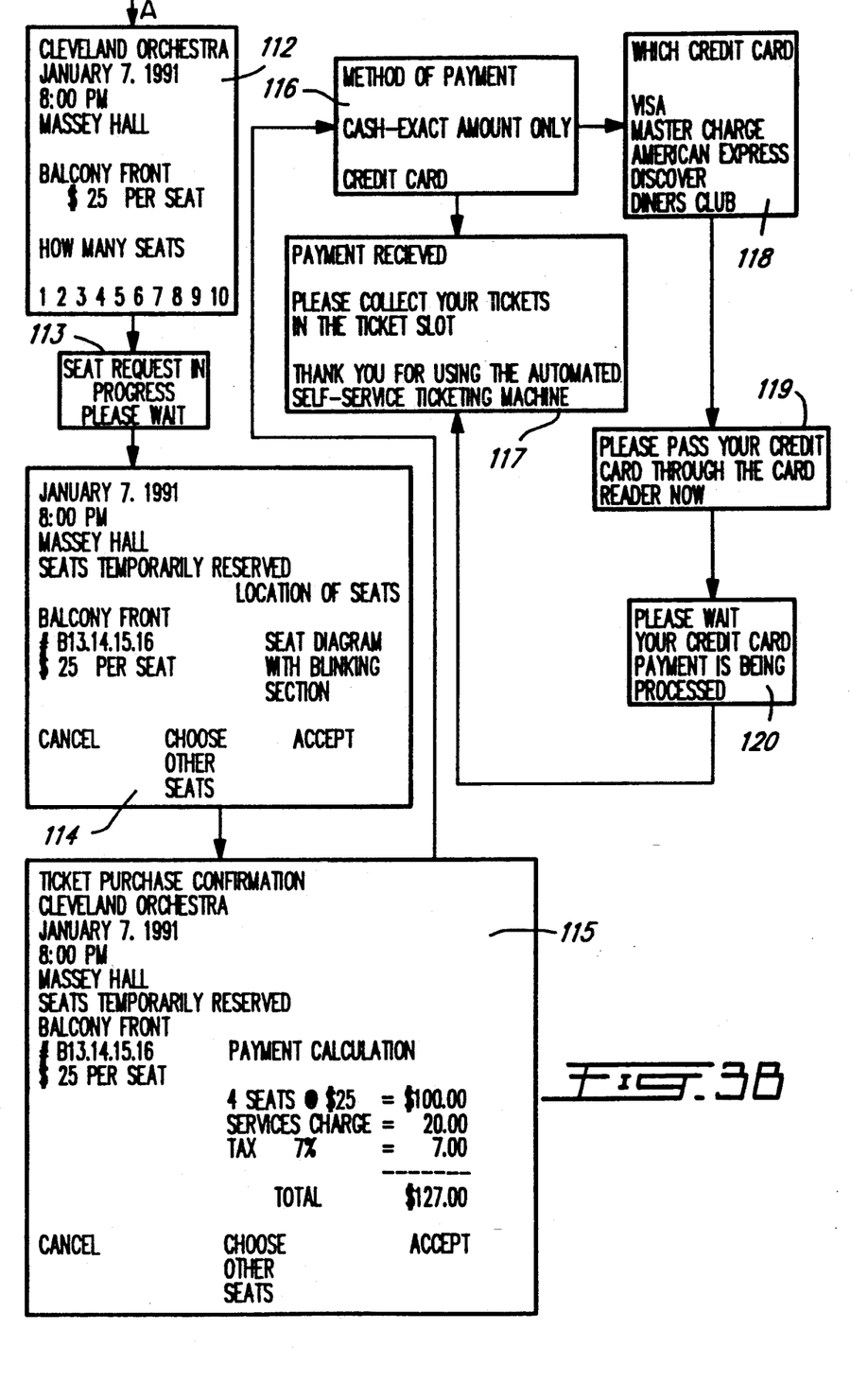

Whether the user is now at the screen as illustrated at 114 in FIG. 3B, or the screen as illustrated in 1002 in FIG. 4, the user must make a decision as to whether to accept the temporarily reserved seats, to choose seats in a different area, or to cancel the procedure. If the user decides to cancel, then the program reverts to its START position. If the user wishes to select seats in a different area, then the program reverts to screen 111 of FIG. 3A and the steps previously described between screen 111 and screen 114 are repeated with the selection of the new area.

If the user decides to accept the seats, then the central processor 1 performs a calculation to determine the cost of the seat, service charges, tax, etc. and it provides this data to the video display device 3 for presentation on the screen 5 as shown at 115 in FIG. 3B. As can be seen at 115 in FIG. 3B, all of the information concerning the temporary reservation is now included on the screen, including, name of the event, the date of the event, the time at which the event starts, the place of the event and the seats which have been temporarily reserved, the cost per seat and the calculation for the total costs for the seats. Once again, the a user can elect to either cancel, whereupon the program will revert to the START position, or to choose other seats, whereupon the program will revert to screen 111 in FIG. 3A, or to accept the tickets.

Should the user decide to accept the ticket, the central processor 1 provides the video display unit 3 with data for querying the user as to the mode of payment, namely, will the payment be in cash or by credit card, as shown at screen 116 in FIG. 3B.

Should the user accept the cash payment option, he inserts the exact amount of cash, in bills, in the currency acceptor 31 which will verify that the correct amount of cash has been deposited. When this has been verified, the central processor 1 provides the video display unit 3 with data for forming the message as illustrated at screen 117 of FIG. 3B.

Figure 5:
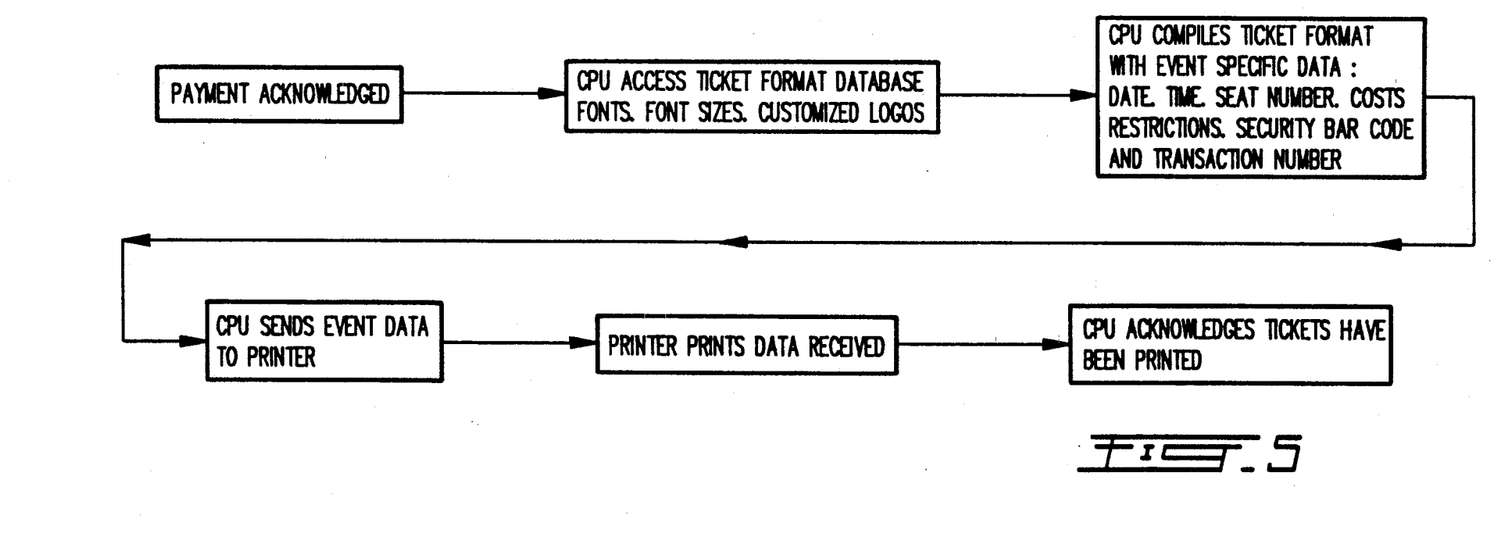
FIG. 5 is a flow chart of the operation involved in the printing of tickets.

Should the user select the credit card option, then the central processor 1 provides the video display unit 3 with data for forming the message illustrated at screen 118, namely, a list of credit cards acceptable to the particular self-service terminal. When the user selects a credit card, the central processor 1 provides the video display unit 3 with data for forming the message on screen 5 as illustrated at screen 119 in FIG. 3B. When the user subsequently inserts his credit card into the credit card reader 33, the central processor 1 provides the video display unit 3 with data for forming the message on its screen 5 as illustrated at screen 120 in FIG. 3B. The central processor 1 then queries the appropriate credit card authority 37 through network modem 25 for obtaining authority to proceed with the transaction. When authority is received, then screen 5 displays the message as shown at screen 117 in FIG. 3B. The central processor 1 then provides data to the ticket printer 23, through communication switch 19, for printing the ticket or tickets purchased. A more detailed flow chart of this process is illustrated in FIG. 5 which is self-evident.

The ticket is then dispensed to the purchaser, and the program reverts to its START position.

In addition to the advantages above-mentioned when using the inventive system, there are still further advantages which have not as yet been discussed as follows:

1. Should a user wish to attend an event on a specific date for celebrating an occasion, e.g., a birthday or an anniversary, but he does not know which events are taking place on that date, he can easily access the events taking place on a date by selecting the third option of the initial screen. Although this same data may be available at manned locations, it may not be available on a per date basis, and the person manning the manned station may not be willing to develop it for the user especially during busy times.

2. When a user wishes to purchase tickets for an event at a manned station, he must usually provide not only the name of the event but the name of the location as well (except in the obvious cases of hockey games, baseball games, etc. where the locations will always be the same). If he does not have both pieces of information, then it may be difficult for the person manning the station to serve the user. With the inventive system, he merely has to select the first option on the initial screen and all of the remaining information will be provided by the system.

3. In a like manner, if a user remembers that he wishes to attend an event at a specific location but forgets the name of the event, he can obtain all of the information by selecting option 2 on the initial screen. A person manning a manned station may not be able to provide the user with all of the information.

As mentioned at the outset, the present invention relates to a self-service terminal, which has been described in detail above, as well as a method for using the self-service terminal, which has also been described in detail above. Suffice it to say that a system in accordance with the invention will include a plurality of such self-service terminals. The self-service terminals would not be linked to each other as there is no necessity for this. However, each self-service terminal is linked to all of the locations serviced by the respective self-service terminal as well as all of the credit authorization facilities associated with the respective self-service terminal.

In accordance with the invention, some of the self-service terminals could service some locations while others of the self-service terminals could service different locations. Thus, the number of locations serviced by the different self-service terminals need not be the same.

Be that as it may, each self-service terminal will have access to all of the best available seats at the time that a purchase is being made instead of having only an allocated number of seats.

Although particular embodiments have been described, this was for the purpose of illustrating, but not limiting, the invention. Various modifications, which will come readily to the mind of one skilled in the art, are within the scope of the invention as defined in the appended claims.

I claim,

1. A self-service terminal for selecting and dispensing tickets, to a user, for any one of a plurality of events on the basis of a plurality of parameters, each parameter having a plurality of elements, each event being held in any one of a plurality of locations, a plurality of location processors equal to the plurality of locations, each location processor being associated with a respective one of said locations;

said self-service terminal comprising:
a central processor and an associated video display device having a display screen;
said central processor including memory means for storing data concerning said plurality of events and said plurality of locations;
said central processor being programmed to permit a user to select one or more tickets for any one of said events, to be held at a predetermined time, at any one of said locations;
said self-service terminal further including:
means for receiving payment for said selected tickets;
means for dispensing said selected tickets; and
means for effecting communication between said central processor and said means for receiving and said means for dispensing;
whereby, said means for receiving and said means for dispensing are under the control of said central processor;
and further including means for effecting communication between said central processor and said locations processors;
said means for effecting communication comprising:
a network server connected to all of said location processors; and
a network modem connecting said central processor to said network server.

2. A self-service terminal as defined in claim 1 wherein said means for dispensing comprises ticket printer means under the control of said central processor.

3. A self-service terminal as defined in claim 1 wherein said means for receiving payment comprises currency acceptor means or a credit card reader.

4. A self-service terminal as defined in claim 3 wherein said means for receiving payment comprises a currency acceptor means.

5. A self-service terminal as defined in claim 3 wherein said means for receiving payment comprises a credit card reader.

6. A self-service terminal as defined in claim 1 wherein said network modem also connects said central processor to any one of a plurality of credit card credit authorization facilities.

7. A self-service terminal as defined in claim 1 further including advertising means for advertising the events serviced by the self-service terminal, said advertising means comprising an audio device or a video device.

8. A self-service terminal as defined in claim 1 including means for advertising a selected event comprising video means for displaying information concerning the selected event.

9. A self-service terminal as defined in claim 1 and further including means for advertising a selected event, said means for advertising the selected event comprising an audio device.

10. A self-service terminal as defined in claim 1 and including means for activating said central processor.

11. A self-service terminal as defined in claim 10 wherein said display screen comprises a touch screen, and wherein said means for activating comprises a selected position on said display screen.

12. A self-service terminal as defined in claim 5 and including means for activating said central processor, said means for activating comprising said credit card reader.

13. A self-service terminal as defined in claim 1 wherein said display screen comprises a touch screen, said self-service terminal further including a touch screen controller, said touch screen being under the control of said touch screen controller.

14. A method of selecting and dispensing tickets to a user, at any one of a plurality of stations, for any one of a plurality of events on the basis of a plurality of parameters, each parameter having a plurality of elements, each event being held in any one of a plurality of locations, each station including a self-service terminal having a central processor and an associated video display device having a display screen, each central processor including memory means for storing data concerning said plurality of events and said plurality of locations, a plurality of location processors equal to the plurality of locations, each location processor being associated with a respective one of said locations, each location processor having memory means for storing an inventory of seat dispositions including available seats and booked seats for events to be held at its respective location, each of said central processors being in communication with all of said location processors;

said method comprising:
A) said user activating said central processor at one of said stations, whereby said central processor provides data to said associated video display device so that said display screen presents an initial screen listing said parameters, whereby said user can select one of said parameters;
B) said central processor providing parameter element data to said associated video display device whereby said display screen presents a parameter screen listing said elements of said one selected parameter, whereby said user can select one of said elements of said selected parameter;
C) said central processor providing further parameter element data to said associated video display device whereby said display screen presents a further parameter screen listing said elements of said further parameter, whereby said user can select one of said elements of said further parameter;
D) repeating step C) until each element of each one of the plurality of parameters has been separately listed, and one element of each parameter has been selected;
whereby, all parameters for the ticket selection have been selected, one of said selected parameters comprising a selected one of said plurality of locations and another one of said selected parameters comprising a selected event at said selected location a third one of said parameters being a selected date for said selected event;

E) said central processor providing data to said associated video display device concerning the seating areas at said location whereby said display screen presents a listing of said seating areas of said selected location, whereby said user can select one of said seating areas;

F) said central processor communicating with said location processor at said selected location to obtain data concerning seat disposition for said selected event at said selected time in said selected area at said selected location;

G) said central processor selecting available seats in said selected area and providing data to said associated video display device whereby said display screen presents a seating lay-out of said seating area, and including means for separately indicating said available seats;

H) said user indicating acceptance or rejection of said available seats;

I) said central processor dispensing tickets for said available seats if said user indicates acceptance of said available seats; or J) if said user refuses said available seats, repeating steps A) to I) until said user accepts available seats or terminates the procedure.

15. A method as defined in claim 14 wherein one of said parameters comprises the events serviced by said self-service terminal, the elements of said one parameter comprising a list of such events in alphabetical order, whereby the user selects one of said events.

16. A method as defined in claim 15 wherein a second one of said parameters comprises said locations, said elements of said second one of said parameters comprising a list of all of said plurality of locations, whereby the user selects one of said locations.

17. A method as defined in claim 16 wherein a third one of said parameters comprises a calendar, the element of said parameter comprising a list of the twelve months of the year, whereby, said user selects one of said months.

18. A method as defined in claim 14 wherein said available seats are separately indicated by blinking the display of said seats on said display screen.

19. A method as defined in claim 14 wherein said user makes payment by inserting currency, in bills, into a currency receiver.

20. A method as defined in claim 14 wherein said self-service terminal includes a credit card reader;
    said user making payment by inserting the credit card into said credit card reader;
    said central processor communicating with a credit card credit granting authority for verifying said credit card;
    said central processor dispensing said tickets when said credit card has been verified.

21. A method as defined in claim 19 wherein said display screen displays a list of acceptable credit cards and said user selects one of said credit cards for insertion into said credit card reader.

* * * * *